United States Patent [19]

Kobayashi et al.

[11] Patent Number: 4,995,029

[45] Date of Patent: Feb. 19, 1991

[54] OPTICAL DISK IDENTIFYING METHOD, MANUFACTURE OF CARTRIDGE-ENCLOSED OPTICAL DISKS, AND OPTICAL DISK CARTRIDGES

[75] Inventors: Hideo Kobayashi; Giichi Shibuya; Osamu Murakami, all of Nagano, Japan

[73] Assignee: TDK Corporation, Tokyo, Japan

[21] Appl. No.: 423,980

[22] Filed: Oct. 19, 1989

[30] Foreign Application Priority Data

Oct. 24, 1988 [JP] Japan .................. 63-267970

[51] Int. Cl.⁵ .................. G11B 7/26; G11B 15/04; G11B 23/02; B65D 85/30
[52] U.S. Cl. .................. 369/291; 360/132; 360/133; 360/060; 206/444
[58] Field of Search .......... 369/291; 360/133, 132, 360/60; 206/444

[56] References Cited

U.S. PATENT DOCUMENTS 3,966,330 6/1976 Ridler et al. .................. 369/190
4,507,692 3/1985 Sasaki .................. 360/60
4,837,758 6/1989 Motoyama et al. .................. 360/13

OTHER PUBLICATIONS

Pierce, J. R., *Symbols, Signals, and Noise*, N.Y., Harper and Row, 1961, p. 287.

*Primary Examiner*—Stuart S. Levy
*Assistant Examiner*—Kenneth B. Wells
*Attorney, Agent, or Firm*—Oblon, Spivak, McClelland, Maier & Neustadt

[57] ABSTRACT

An optical disk in a cartridge can be identified when loaded in a disk drive system, by changing the openness of a hole in the cartridge to impart at least four types of identifying information, and detecting the openness of the hole by a sensor in the drive system. To establish four different states, two small and large apertures are formed in major walls of the cartridge to define a through window and a shield member is fixedly or slidably mounted between the walls so as to clear or shield a portion or the entirety of the through window.

7 Claims, 7 Drawing Sheets

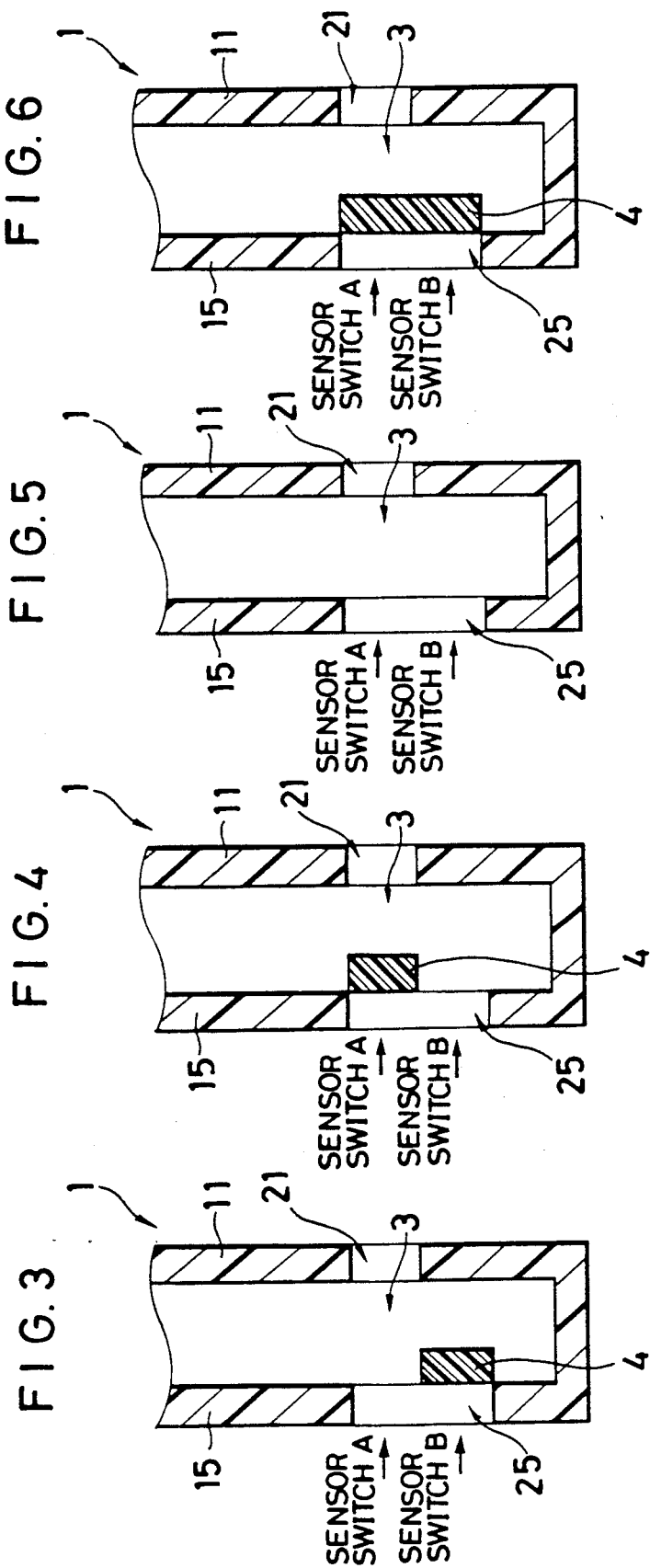

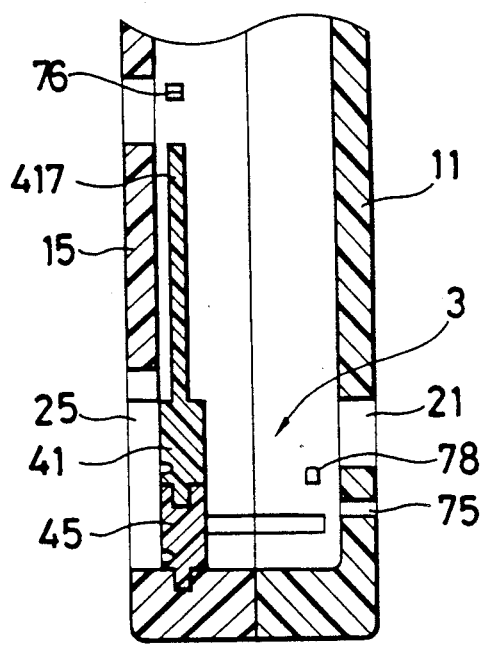
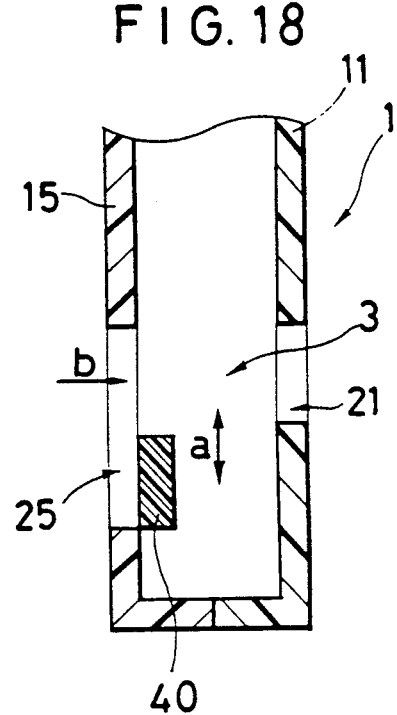
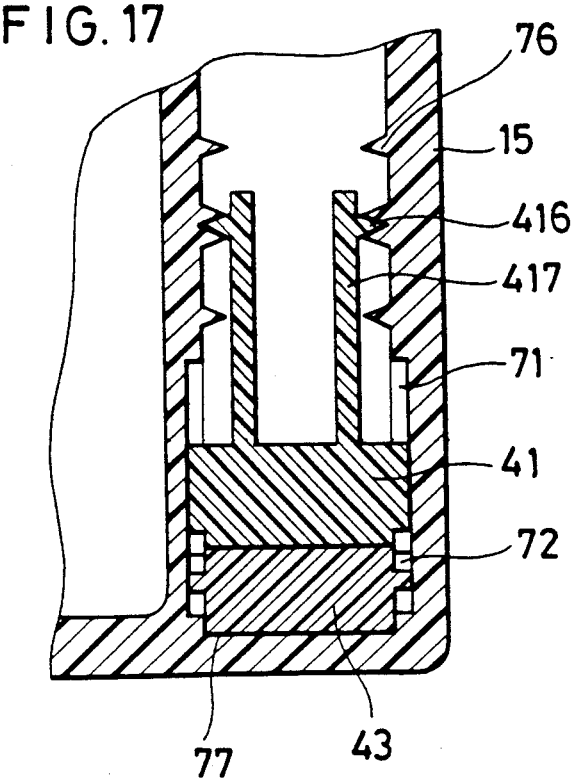

OPTICAL DISK IDENTIFYING METHOD, MANUFACTURE OF CARTRIDGE-ENCLOSED OPTICAL DISKS, AND OPTICAL DISK CARTRIDGES

BACKGROUND OF THE INVENTION

This invention relates to a method for identifying optical disks, the manufacture of cartridge-enclosed optical disks, and optical disk-enclosing cartridges.

A variety of optical read only disks, optical recording disks, and magnetooptical recording disks have been developed and utilized as various document and image storage files. These optical disks should be accommodated in casings or cartridges in order to keep off dust. Some manufacturers recently proposed to use optical disks as accommodated in a standardized cartridge similar to that of floppy magnetic disks. As is well known in the art, the standard for cartridges of magnetic floppy disks, for example, 3½ inch disks defines the provision of a so-called called write protect tab window at the predetermined corner of the cartridge.

FIG. 18 illustrates a fragmental portion of a standard prior art cartridge with a write protect tab. The cartridge generally designated at 1 includes an upper shell 11 with a first aperture 21 and a lower shell 15 with a second aperture 25. The second aperture 25 is larger than the first aperture 21 and is disposed in registry with the first aperture in a direction perpendicular to the upper and lower shells 11 and 15. The first and second apertures 21 and 25 together define a through hole 3, the through hole 3 serving as a write protect window. The lower shell 15 is provided with a tab 40 for sliding motion over the area of second aperture 25 in a direction indicated by double-sided arrow a.

The tab 40 is illustrated at the position where the tab does not shield the overlapped area of the through hole 3 between the first and second apertures 21 and 25, presenting a protected or unrecordable state. If the tab 40 is moved upward (inside) from the illustrated position, the tab shields the overlapped area of the through hole 3 between the first and second apertures 21 and 25, presenting a recordable state. Whether or not the tab 40 shields the overlapped area of the through hole 3 between the first and second apertures 21 and 25 may be detected by means of a sensor switch in the form of a mechanical switch which is provided in the drive system though not shown in the figure. The sensor switch can be inserted into the through hole 3 in the direction indicated by arrow b. Then the sensor switch detects two states, unrecordable and recordable states in terms of the extent to which the sensor switch can enter the through hole 3.

It was proposed to establish a standard for cartridge-enclosed optical disks by prescribing such a write protect tab.

At present, optical disks are available in various standards and types. If disks of different standards can be operated with a single drive system, it is convenient for the users. Efforts have been made to provide such compatibility. In order that a single drive system operate optical disks of different standards and types, the drive system has to identify the standard or type of a particular disk.

If the write protect tab illustrated in conjunction with the conventional floppy disk cartridge is applied to the optical disk cartridge, it becomes possible to identify two bits of information. Identification of only two types of information is unsatisfactory for optical disks. The cartridge must be further provided with a newly standardized aperture or recess before an additional set of information can be applied to the optical disk.

SUMMARY OF THE INVENTION

Therefore, an object of the present invention is to provide a novel optical disk identifying method capable of identifying more than two types of identifying information with a simple modification on the existing cartridge.

Another object of the invention is to provide a method for manufacturing optical disks accommodated in cartridges having identifiable indications.

A further object of the invention is to provide an identifiable cartridge for an optical disk.

According to a first aspect of the present invention, there is provided a method for identifying an optical disk in a cartridge when loaded in a disk drive system, comprising the steps of changing the openness of a hole in the cartridge to provide at least four types of identifying information, providing the drive system with sensor means for detecting the openness, and detecting the openness of the hole by the sensor means to obtain at least four types of identifying information.

According to a second aspect of the present invention, there is provided a method for manufacturing cartridge enclosed optical disks, comprising the steps of preparing at least four types of optical disks, preparing at least four types of cartridges having a variable hole whose opening can be changed to at least four different states, the four types of cartridge corresponding to the four types of optical disk, and accommodating optical disks of a particular type in cartridges of the corresponding type.

According to a third aspect of the present invention, there is provided a cartridge for accommodating an optical disk therein, comprising a pair of opposed first and second major walls, a first aperture in the first major wall, a second aperture in the second major wall, the second aperture being larger than the first aperture and located in general registry with the first aperture to define a through hole, and a member secured to the second wall to shield a portion or the entirety of the through hole.

According to a fourth aspect of the present invention, there is provided a cartridge for accommodating an optical disk therein, comprising a pair of opposed first and second major walls, a first aperture in the first major wall, and a second aperture in the second major wall, the second aperture being larger than the first aperture and located in general registry with the first aperture to define a through hole.

According to a fifth aspect of the present invention, there is provided a cartridge for accommodating an optical disk therein, comprising a pair of opposed first and second major walls, a first aperture in the first major wall, a second aperture in the second major wall, the second aperture being larger than the first aperture and located in general registry with the first aperture to define a through hole, and at least two members associated with the through hole for cooperative motion to clear or shield a portion or the entirety of the through hole.

BRIEF DESCRIPTION OF THE DRAWINGS

The above and other objects, features, and advantages of the present invention will be better understood from the following description taken in conjunction with the accompanying drawings, in which:

FIGS. 3 to 6 are enlarged fragmentary cross sections of the cartridge walls encircling the through hole with or without a tab, showing one embodiment of the identifying method according to the present invention;

FIG. 8 being an enlarged fragmentary plan view of the cartridge, FIG. 9 is a cross section taken along lines IX—IX in FIG. 8, FIG. 10 being a cross section taken along lines X—X in FIG. 9, FIG. 11 being a cross section taken along lines XI—XI in FIG. 9;

FIGS. 12, 14, and 16 are fragmentary elevational cross sections similar to FIG. 10, showing tabs in different positions in the cartridge of FIG. 8;

FIGS. 13, 15, and 17 are fragmentary transverse cross and 16, respectively; and

FIG. 18 is an enlarged fragmentary cross section of a prior art cartridge for a magnetic floppy disk.

Like parts are designated by the same numerals throughout the figures.

DESCRIPTION OF THE PREFERRED EMBODIMENTS

Figure 1:
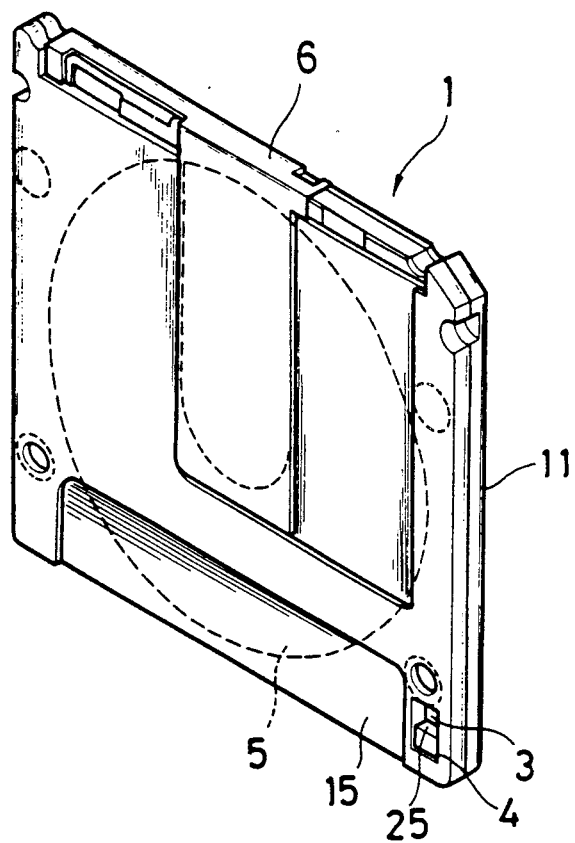
FIGS. 1 and 2 are perspective views of a cartridge enclosing an optical disk according to one preferred embodiment of the invention, FIG. 1 showing the cartridge from the clamping or back side and FIG. 2 showing the cartridge from the non-clamping or front side.
Figure 2:
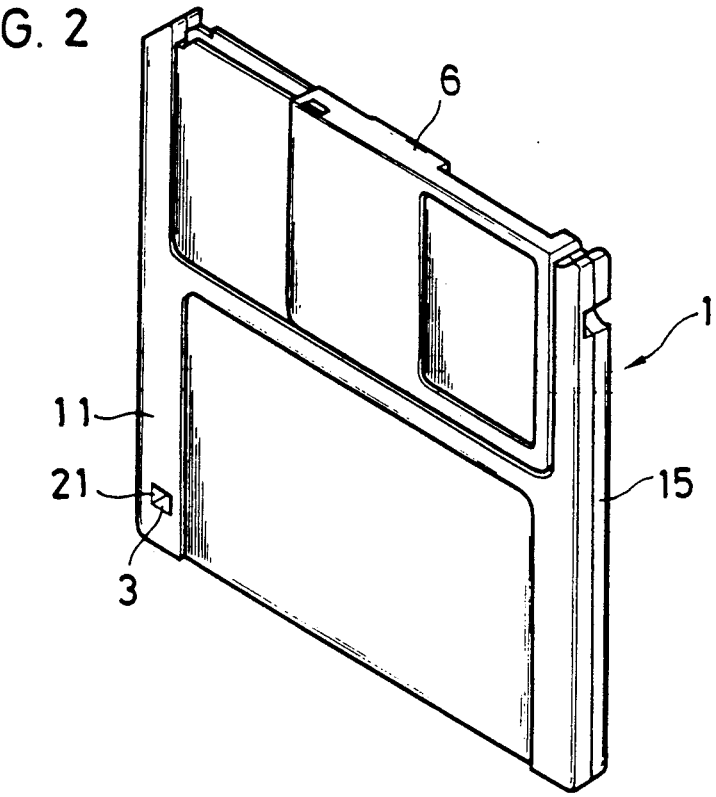

Referring to FIGS. 1 and 2, there are illustrated back and front sides of an optical disk cartridge according to one preferred embodiment of the present invention. The cartridge generally designated at 1 is generally composed of mating upper and lower shells 11 and 15 both of generally square configuration. The upper and lower shells 11 and 15 both have major surfaces extending in parallel to one another. The lower shell 15 is located on the clamp side when the cartridge is loaded in the disk drive. An optical disk 5 shown by phantom line in FIG. 1 is rotatably received in the cartridge or between the upper and lower shells 11 and 15. The cartridge 1 further includes a shutter 6 which is slidably mounted on the shells such that it may be moved aside for allowing recording and reproducing operation when the cartridge is loaded in the disk drive. The construction of the optical disk cartridge 1 described as far is generally identical with that of the standard 3½ inch floppy disk cartridge.

Like the 3½ inch floppy disk cartridge with a write protect hole, the optical disk cartridge 1 is provided with a through hole 3 in the portions of the major surfaces of the upper and lower shells 11 and 15 located outside the circumference of optical disk 5.

The construction of through hole 3 is best shown in FIGS. 3 to 6, which correspond to a fragmental portion of the cartridge 1 of FIGS. 1 and 2 encircling the through hole 3. The upper shell 11 is formed with a first aperture 21 which is generally of rectangular shape in a plan view (see FIG. 2). The lower shell 15 is formed with a second aperture 25 which is generally of rectangular shape in a plan view (see FIG. 1), but has a larger area than the first aperture. The second aperture 25 is most often of a rectangular shape having the same transverse distance as the first aperture 21 and twice the longitudinal distance of the first aperture 21. Restated, the first aperture 21 in the upper shell 11 has an area of approximately one-half the area of the second aperture 25 and is located in substantial registry with the half area of the second aperture 25 located inside or nearer to the optical disk 5. The first aperture 21 is substantially aligned with the inside half area of the second aperture 25 in a direction perpendicular to the major surfaces of the shells. The aligned arrangement of the first and second apertures 21 and 25 forms the through hole 3.

Since the second aperture 25 has a larger area than the first aperture 21, the through hole 3 includes an overlapped portion of apertures 21, 25 and a non-overlapped portion of apertures 21, 25. The present invention utilizes the thus created through hole 3 similar to the write protect hole in the conventional floppy disk cartridge. The open or shielded state of the hole may be changed to provide identifying information for a particular optical disk.

The preferred embodiment shown in FIGS. 3 to 6 gives four (4) types of identifying information. In FIG. 3, a half size tab 4 is secured to the outside half area of the second aperture 25 where the first aperture 21 does not overlap the second aperture 25, shielding a portion, more particularly the outside half area of the through hole 3.

In FIG. 4, a half size tab 4 is secured to the inside half area of the second aperture 25 where the first aperture 21 overlaps the second aperture 25, shielding another portion, more particularly the inside half area of the through hole 3.

In FIG. 5, no tab exists in the through hole 3. The through hole 3 is left fully open.

In FIG. 6, a double size tab 4 is secured to the entire area of the second aperture 25 to completely shield the through hole 3.

There are established two partially open states, one fully open state, and one fully shielded state, that is, 4 different combinations of open and shielded states. For the cartridge 1 having at least 4 different combinations of open and shielded states, preferably two or more sensors may be used to detect the information.

The drive mechanism includes two or more sensors located in facing relation to the apertures in the cartridge. The respective sensors detect the open or shielded state of corresponding sections of the through hole as "1" or "0". The sensors may be selected from mechanical sensor switches, optical sensors and any other well-known sensors.

The embodiment shown in FIGS. 3 to 6 represents the use of mechanical sensor switches. The drive mechanism is provided with sensor switches A and B in facing relation to the overlapped and non-overlapped sections of apertures 21 and 25 in a direction perpendicular to the shell major surfaces. The sensor switches A and B are inserted into the corresponding aperture sections from the left in the arrowed direction to detect the four combinations of open and shielded states.

Figure 7:
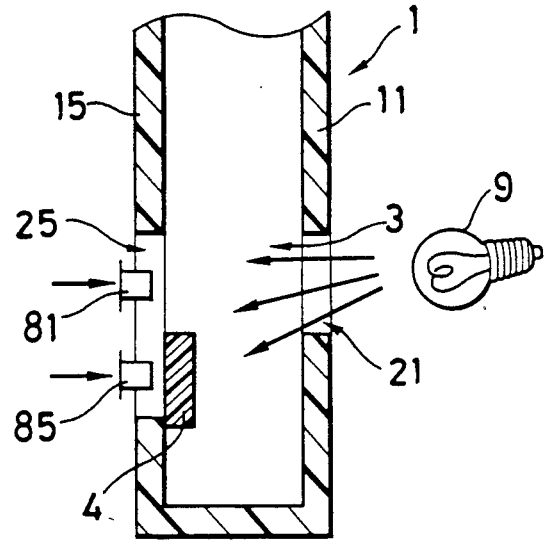
FIG. 7 is an enlarged fragmentary cross section of the cartridge walls encircling the through hole with a tab, showing another embodiment of the identifying method according to the present invention.
Figure 8:
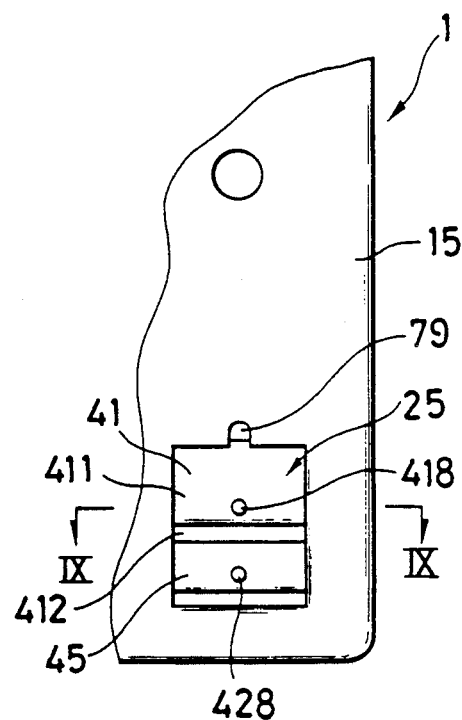
FIGS. 8, 9, 10, and 11 illustrate a cartridge according to a further embodiment of the present invention.
Figure 9:
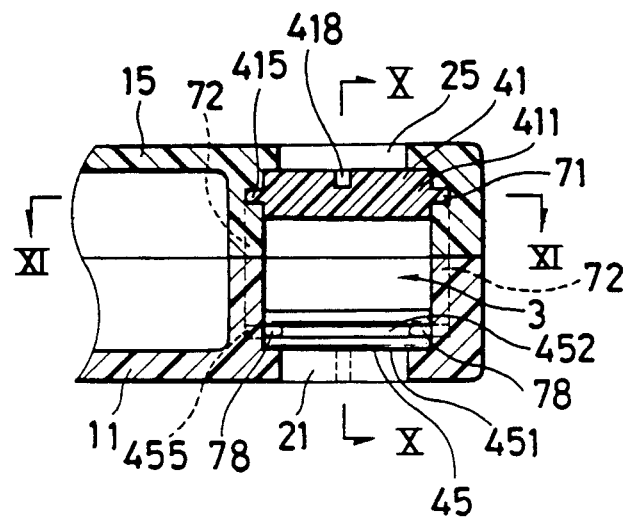

The use of optical sensors is illustrated in FIG. 7. A light source 9 is located adjacent, preferably above the first aperture 21 in the upper shell 11. Optical sensors 81 and 85 are located in or adjacent the second apertures 25 in the lower shell in facing relation to the overlapped and non-overlapped sections of apertures 21 and 25. The light source 9 emits light toward the second aperture 25 through the first aperture 21 and the sensors 81 and 85 will sense the transmitted light if the corresponding sections are not shielded, detecting the four different combinations of open and shielded states set up in the through hole 3. In the illustrated example, the sensor 81 detects the transmitted light whereas the sensor 85 does not, indicating an inside half open state. Instead of detecting the quantity of transmitted light, the optical sensors 81 and 85 may be of the type detecting the quantity of reflected light.

The four or more types of identifying information represent combinations of at least two of the following situations.

(1) Whether the disk is recordable or dedicated for only reproduction.

(2) Whether the reflectance is higher or lower than a predetermined value.

(3) Whether the reflectance at recording spots is higher or lower than the surrounding areas.

(4) Whether or not the disk is recorded or formatted in a different recording mode.

(5) Whether the disk is single or double sided.

It is now assumed that four or more different combinations of open and shielded aperture states correspond to particular combinations of these types of identifying information. There will be manufactured four or more types of optical disks each having one particular combination of the types of identifying information. Then the manufacturer can prepare four or more types of cartridges each having one of four or more different combinations of open and shielded aperture states. A particular type of optical disk is received in a corresponding type of cartridge. There is obtained an optical disk cartridge with the identifying information about its disk.

This is the case where the manufacturer selects a particular one from cartridges having different aperture states for a particular type of disk to be accommodated therein.

It sometimes occurs that the user wishes to apply the following identifying information to the optical disk.

(a) Whether or not the disk may be recorded.

(b) Whether the disk is dedicated for both program and data storage or for data storage only.

In this case, the tab 4, or one or both of divided halves of the tab 4, may be arranged in a guide channel or channels on the inner walls of the shells 11 and 15 for sliding motion in the apertures. Then the tab 4 is adapted to be changed in position in the cartridge aperture depending on a particular allotted service of the disk in the cartridge.

An embodiment of movable divided tab halves is illustrated in FIGS. 8 to 17. This embodiment uses two tabs in the form of first and second tabs 41 and 45 including rectangular plate-shaped blocks 411 and 451. The upper and lower shells 11 and 15 on the inner walls and a web there between are provided with first and second guide channels 71 and 72 in which the first and second tabs 41 and 45 are slidably engaged, respectively. The first and second channels 71 and 72 extend in vertical and horizontal directions, respectively, as viewed in the figures.

Figure 10:
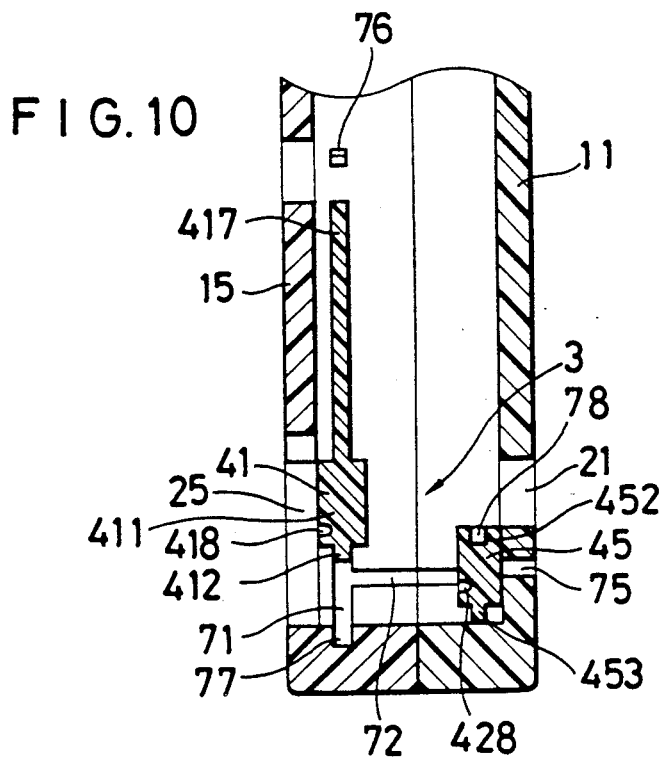
Figure 11:
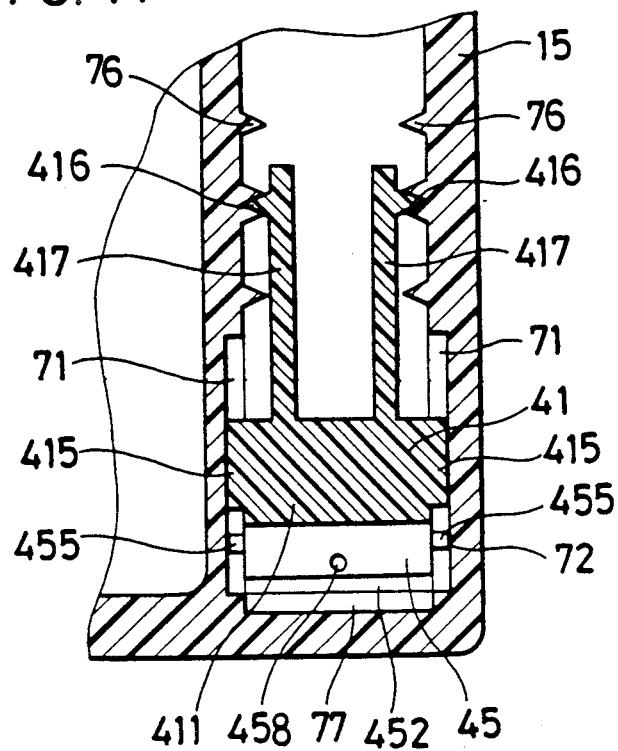

The block 411 of tab 41 on the opposite sides is provided with ribs 415 engaging with the guide channels 71 so that the tab 41 is movable in a vertical direction as viewed in FIG. 10. The tab block 411 on the top is provided with vertically extending arms 417 having claws 416 as shown in FIG. 11. The shell 15 on the inner wall is provided with detents 76 at three levels. The openness of aperture 25 is selected from its three states depending on whether the claws 416 engage the upper, intermediate or lower detents 76.

The block 451 of tab 45 on the opposite sides is provided with ribs 455 engaging with the guide channels 72 so that the tab 45 is movable in a horizontal direction as viewed in FIG. 10. The tab block 451 is provided at the top with a channel 452 and at the bottom with a rib 453. The shells 15 and 11 are provided with stops 78 and 77, respectively., The tab 45 is snapped in place on the side of the upper shell 11 through engagement of the channel 452 with the stop 78, and on the side of the lower shell 15 through engagement of the rib 453 with the stop 77.

The upper shell 11 is formed with another aperture 49 through which a suitable tool is accessible for urging the second tab 45 to move toward the lower shell 15. The tab blocks 411 and 451 are provided with notches 418 and 428 on the side of aperture 25 for helping a suitable tool engage the tab blocks for movement. The shell 15 is provided with a cutout 79 for allowing for engagement of the tool with the notch 418 on the tab block 411 when it is retracted or at the upper position (see FIGS. 12 and 14).

The first and second tabs 41 and 45 are cooperatively configured such that they may mate together when urged in place. The tab block 411 at the bottom is provided with a rib 412 which is adapted to engage with the channel 452 at the top of the tab block 451.

In FIGS. 10 and 11, the first tab 41 is placed in the inside half area of the second aperture 25 and the second tab 45 is retracted, leaving open only the outside section of the through hole 3.

Figure 12:
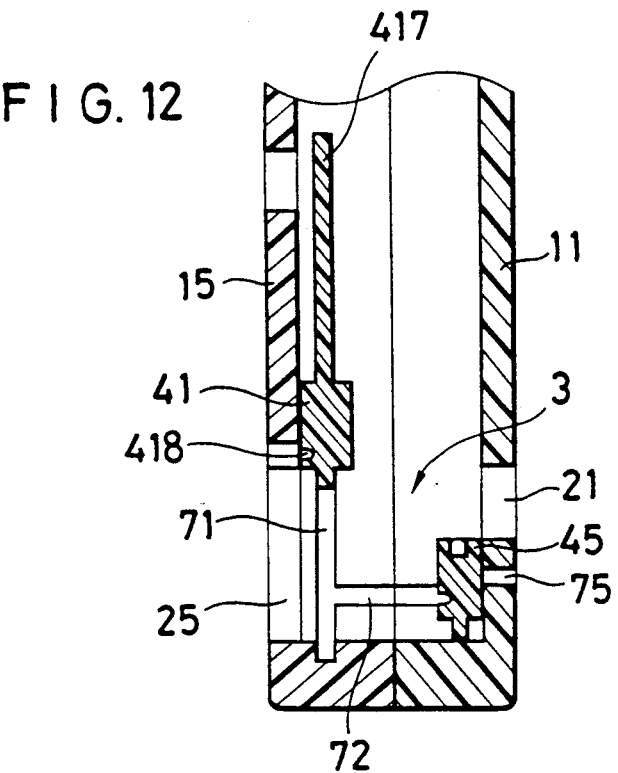
Figure 13:
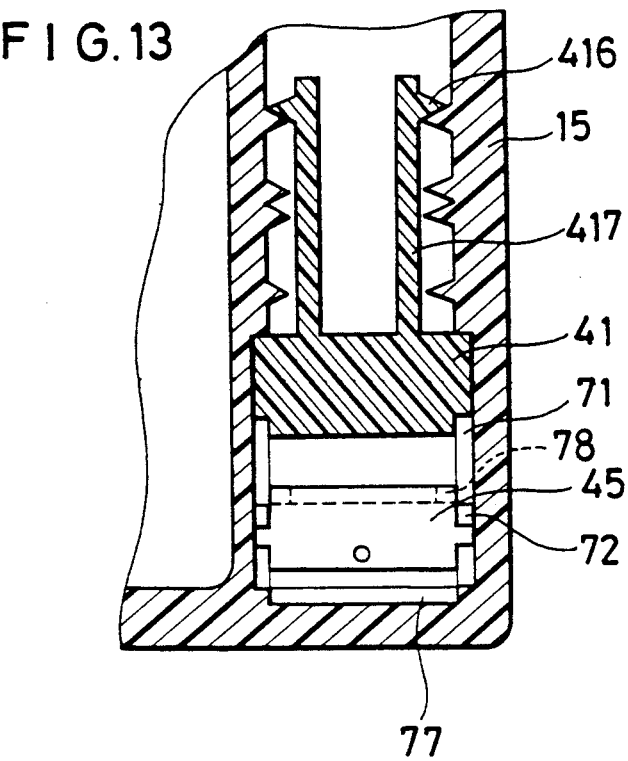

In FIGS. 12 and 13, both the first and second tabs 41 and 45 are retracted, leaving the through hole 3 fully open.

Figure 14:
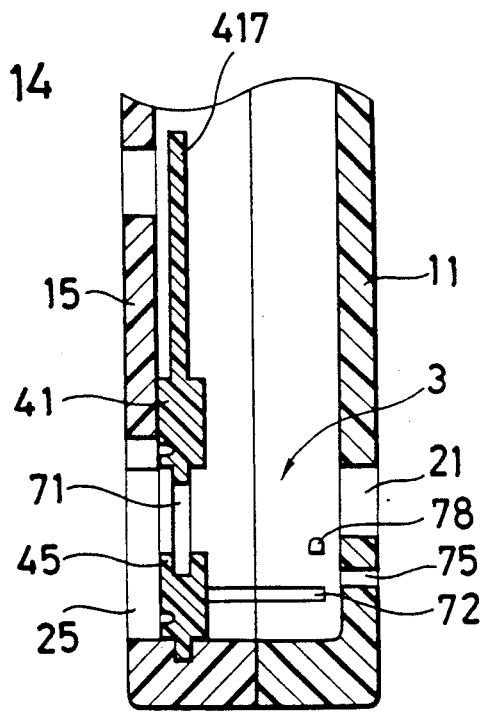
Figure 15:
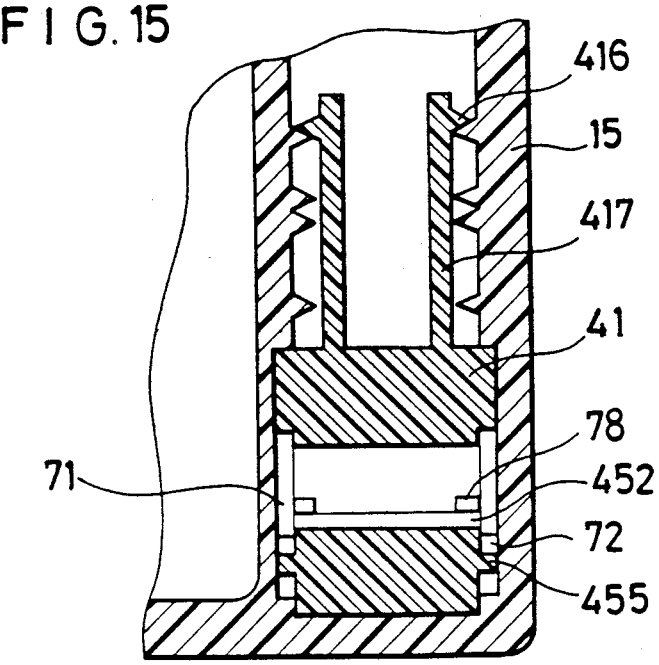

In FIGS. 14 and 15, the first tab 41 is retracted and the second tab 45 is advanced toward the aperture 25, leaving open only the inside section of the through hole 3.

In FIGS. 16 and 17, both the first and second tabs 41 and 45 are advanced so that they mate in close engagement, completely blocking the through hole 3.

It will be clearly understood that the state of FIGS. 10 and 11 corresponds to the partial open state of FIG. 4, the state of FIGS. 12 and 13 corresponds to the fully open state of FIG. 5, the state of FIGS. 14 and 15 corresponds to the partial open state of FIG. 3, and the state of FIGS. 16 and 17 corresponds to the fully closed state of FIG. 6.

With the arrangement of two slidable tabs in opposed apertures as illustrated in FIGS. 8 to 17, there are obtained four (4) different combinations of open and shielded state The user can select any desired one of these four opening states by manually moving the tabs with a suitable tool like a pointed bar.

Alternatively, the second tab 45 may be fixedly secured or omitted as a fixed type of identifying information at the time of manufacture and the first tab 41 is adapted to be slidably movable for identifying whether or not the disk is recordable.

Alternatively, the tab 4 shown in FIG. 6 as entirely blocking the larger aperture 25 is adapted to be movable to change the shielding of the aperture 25.

In either case, the position or the presence or absence of a tab or block in the through hole 3 is detected by at least two sensors installed in the drive system.

There have been described a novel optical disk identifying method and an identifiable cartridge for optical disks. Any of the four types of identifying information can be imparted to the cartridge. The applied types of information can be detected by a sensor so that a signal indicative of the identifying information about a different standard or type of a particular optical disk can be delivered to the drive system.

The cartridge need not be of a special dedicated structure while the drive system need not be of a special complicated construction. The conventional write protect hole can be utilized with a minimal modification on the tab. If the present method is adopted as a standard, there are obtained cartridge-enclosed optical disks which are made well compatible among different drive systems simply by making a modification on the tab of the conventional cartridge and adding a sensor to the conventional drive system without altering the method and construction for identifying whether or not the disk is recordable.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for identifying an optical disk in a cartridge in a disk drive system, wherein the cartridge is provided with a variable hole whose opening configuration can be changed to provide at least four predetermined opening configurations each representing a type of identifying information, and the disk drive system is equipped with sensor means, said method comprising the steps of:
   setting the opening configuration of the hole to one of the four predetermined opening configurations representing a particular type of identifying information, and
   detecting the opening configuration of the hole by said sensor means to obtain the particular type identifying information represented by the detected opening configuration.

2. A method for manufacturing cartridge enclosed optical comprising the steps of:
   preparing at least four types of optical disks,
   preparing at least four types of cartridges each having a different predetermined opening configuration corresponding to the four types of optical disks, and
   accommodating each of the at least four types of optical disks in different cartridges each having a different opening configuration to identify the type of optical disk contained therein.

3. The method of claim 3, wherein said hole is a through hole extending between walls of the cartridge and wherein said sensor means includes at least a pair of mechanical sensors whereby the predetermined opening configuration of the hole is detected by the extent to which the mechanical sensors can enter said through hole through one of the walls of the cartridge.

4. The method of claim 3, wherein the variable hole is a through hole and wherein said sensor means includes at least a pair of optical sensors which sense one of the quantity of light transmitted through the variable hole and the quantity of light reflected by said through hole to detect the predetermined opening configuration of the hole.

5. A method for identifying an optical disk in a cartridge when loaded in a disk drive system comprising the steps of:
   forming a hole in a surface of the cartridge, the hole having a predetermined opening configuration;
   changing the predetermined opening configuration of the hole to provide a total of at least four different opening configurations of the hole, each of the at least four different opening configurations of the hole representing a different type of information identifying features of the optical disk contained by the cartridge;
   providing the drive system with sensor means for detecting each different opening configuration of the hole; and
   detecting the opening configuration of the hole with the sensor means to obtain at least four types of information represented by each detected opening configuration of the hole.

6. A cartridge for accommodating and identifying an optical disk contained therein, comprising:
   a pair of juxtaposed first and second major walls;
   a first aperture in the first major wall;
   a second aperture in the second major wall juxtaposed to and overlapping a portion of the first aperture, the second aperture being larger than the first aperture and located relative thereto so as to define a through hole;
   a first tab having means for movement between the first and second apertures, the first tab blocking a portion of the second aperture when positioned at the second aperture and unobstructing the first aperture when positioned at the first aperture;
   a second tab positioned at the second aperture and having means for movement substantially parallel to an outline of the second aperture between at least first and second positions, the first position of the second tab unobstructing the second aperture and the second position of the second tab blocking a portion of the second aperture which is not blocked by the first tab when the first tab is positioned at the second aperture so as to close the second aperture;
   whereby the second aperture is provided with four different opening configurations including: unobstructed, partially obstructed by the first tab, partially obstructed by the second tab and closed by the first and second tabs.

7. A method according to claim 3, wherein each of the at least four types of cartridges has a variable hole whose opening configuration can be changed to at least four different predetermined opening configurations.

* * * * *

UNITED STATES PATENT AND TRADEMARK OFFICE
CERTIFICATE OF CORRECTION

PATENT NO. : 4,995,029

DATED : February 19, 1991

INVENTOR(S) : HIDEO KOBAYASHI ET AL

It is certified that error appears in the above-identified patent and that said Letters Patent is hereby corrected as shown below:

```
Column 7, line 41:
Claim 1, line 2, after "cartridge", insert --when loaded--;
Column 7, line 58:
Claim 2, line 2, after "optical", insert --disks--.
```

Signed and Sealed this

Sixth Day of October, 1992

*Attest:*

DOUGLAS B. COMER

*Attesting Officer*  *Acting Commissioner of Patents and Trademarks*